(No Model.)
P. H. CHERRY.
LEMONADE MIXER.
No. 288,775.
Patented Nov. 20, 1883.
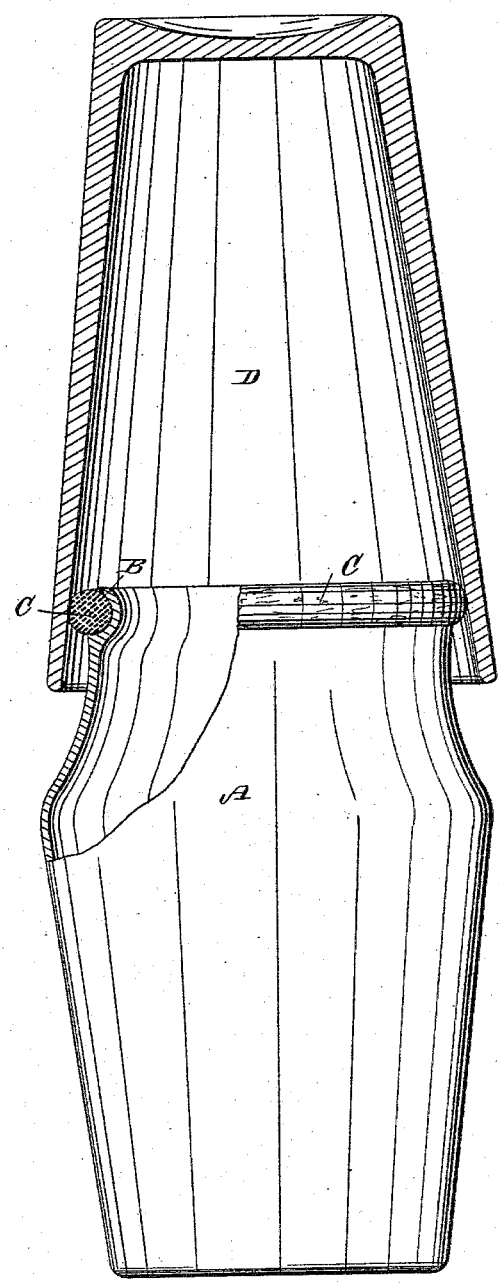
WITNESSES:
Theo. G. Hoster
C. Sedgwick
INVENTOR:
P. H. Cherry
BY Munn & Co.
ATTORNEYS.

UNITED STATES PATENT OFFICE.

PETERSON H. CHERRY, OF PARSONS, KANSAS.

LEMONADE-MIXER.

SPECIFICATION forming part of Letters Patent No. 288,775, dated November 20, 1883.

Application filed August 7, 1883. (No model.)

*To all whom it may concern:*

Be it known that I, PETERSON H. CHERRY, of Parsons, in the county of Labette and State of Kansas, have invented a new and Improved Lemonade-Mixer, of which the following is a full, clear, and exact description.

The object of my invention is to provide a new and improved cup for mixing lemonade and other mixed and fancy drinks.

The invention consists in a cup or vessel provided with an annular groove in its outer surface and at its upper edge, into which groove a rubber packing-ring is placed. If a tumbler is pressed on the cup, the inner surface of the tumbler is pressed against the ring, and thus a close joint is formed, which prevents the liquid from leaking out of the mixer or the tumbler.

Reference is to be had to the accompanying drawing, forming part of this specification, in which a longitudinal view of my improved lemonade-mixer is shown, parts being broken out, others shown in section, and the tumbler shown in section.

A cup or vessel, A, made of glass, porcelain, metal, or any other suitable material, is provided at its rim with an annular groove, B, in its outer surface, into which rim a packing-ring, C, of india-rubber, is placed, the packing-ring being held in the groove by the tension on the rubber. The upper part of the cup or vessel A can be contracted, as shown, so as to get a better bearing for the lower part of the ring. The tumbler D is inverted, is then placed over the cup or vessel A, and is pressed down until the packing-ring C is pressed firmly against the inner surface of the tumbler. The tumbler and the cup are then shaken, whereby the lemonade or other mixed or fancy drink in the cup and tumbler will be mixed thoroughly. The packing-ring C prevents the liquid from leaking out of the tumbler and cup while shaking them. The metal mixers generally used leak while the drinks are being mixed.

Having thus described my invention, what I claim as new, and desire to secure by Letters Patent, is—

As an improved article of manufacture, a lemonade-mixer consisting of the vessel A, having its mouth of less diameter than the open end of an ordinary tumbler, and provided with the elastic packing C, contained in the annular groove B, formed on the outside of the vessel, around its mouth, whereby the packing will be compressed when the mouth of the vessel is inserted in a tumbler, forming a tight joint between the tumbler and vessel, and all the contents of the vessel allowed to drip into the tumbler, as set forth.

PETERSON H. CHERRY.

Witnesses:
HENRY T. MOORE,
WILL G. BOYD.